Sept. 29, 1970 N. E. SINDLINGER 3,531,062
MINIATURE TAPE PHONOGRAPH DRIVE SYSTEM
Filed Feb. 29, 1968 3 Sheets-Sheet 1

INVENTOR
NORMAN E. SINDLINGER
BY
Amster & Rothstein
ATTORNEYS

INVENTOR
NORMAN E. SINDLINGER
BY
Amster & Rothstein
ATTORNEYS

Sept. 29, 1970 N. E. SINDLINGER 3,531,062

MINIATURE TAPE PHONOGRAPH DRIVE SYSTEM

Filed Feb. 29, 1968 3 Sheets-Sheet 3

INVENTOR
NORMAN E. SINDLINGER
BY
Amster & Rothstein
ATTORNEYS 3,531,062

MINIATURE TAPE PHONOGRAPH DRIVE SYSTEM

Norman E. Sindlinger, Medford Lakes, N.J., assignor to Ideal Toy Corporation, Hollis, N.Y., a corporation of New York Filed Feb. 29, 1968, Ser. No. 709,359
Int. Cl. G03b *1/12;* G11b *15/32;* A63b *3/33*
U.S. Cl. 242—201 5 Claims

ABSTRACT OF THE DISCLOSURE

A miniature tape audio device for use in toy dolls and the like. The recording on the tape is such that for proper play of the tape the linear speed must decrease from approximately 13 inches per second at the beginning of the play to about 7 inches per second at the end of the play. This is achieved by using small diameter take-up and supply drums compensating for tape build-up effects. In the prior art, where relatively constant tape speed has been a design necessity, large diameter drums and/or short tapes have been used to limit tape speed variations. In the invention, tape speed variations are purposely allowed to permit the use of small drums and the construction of the smallest possible unit, and at the same time to improve overall message quality.

This invention relates generally to audio devices for use in dolls, toys and the like, and more particularly to a tape phonograph which is very small.

In a miniature phonograph of the tape variety there is generally provided both a take-up drum and a supply drum, between which the phonograph tape is transferred during wind-up and playback. During the winding operation, the tape is transferred to the supply drum, e.g., by the pulling out of a drawstring. At the same time, a spring, attached to the take-up drum, is wound up. Upon release of the string, the spring unwinds and turns the take-up drum. The tape is transferred from the supply drum to the take-up drum. During playback the tape is in contact with a stylus and speaker, and the message recorded on the tape is heard by the child.

In the typical prior art device, the message recorded on the tape is such that for proper playback the tape must travel at a constant speed past the stylus. If the linear speed of the tape varies, the pitch of the audible message will change. It is common practice to incorporate a mechanical governor in the audio device for the purpose of maintaining a constant tape speed during play. But the prior art approach has not permitted miniature designs of acceptable message quality.

As the tape unwinds from the supply drum and winds up on the take-up drum, it is apparent that the outside tape diameter of the supply drum decreases, and the tape diameter of the take-up drum increases. As will be shown below, these tape build-up effects tend to decrease the linear speed of the tape as play progresses. In the prior art, the variable tape feed problem has been ignored or has been overcome with a brute force approach. The take-up and supply drums have been made with relatively large diameters and/or short tapes have been used to avoid significant tape build-up effects. Both diameters have been made large enough such that the percentage change between the diameter of a fully wound drum and a fully unwound drum is small. For example, if the thickness of the layers of tape on a fully wound drum is no more than five percent of the radius of the drum itself (with no tape wound on it), variations in the pitch of the reproduced sound are usually tolerable. These large drums are one of the major contributing factors to the large size of prior art devices, and/or the use of short tapes.

It is the general object of this invention to provide a tape phonograph device in which small diameter take-up and supply drums may be used for allowing miniature designs of high message quality.

Briefly, in accordance with the principles of my invention no attempt is made to prevent a decrease in the tape speed as playback progresses. Small diameter take-up and supply drums are used. In the illustrative embodiment of the invention, the tape slows down approximately 33⅓ percent because of direct tape build-up effects. Depending upon governor characteristics, an additional 5% to 15% drop in linear speed will occur. The average playback speed is 10 inches/second. Under these conditions excellent quality can be obtained. The pitch of the audible message is unaffected because the recording on the tape is such that for proper pitch throughout the play it is necessary for the tape to slow down as the play prorgesses. In other words, by initially recording the message on the tape in an atypical manner, the previously described tape speed variation will be matched. Small diameter drums are used to achieve the designed tape speed variation, thereby contributing to a miniature design.

It is a feature of my invention to provide, for use in a miniature tape phonograph device having small diameter supply and take-up drums, a tape having recorded thereon a message which for proper playback requires a relatively large decrease in the linear speed of the tape as the play progresses.

Further objects, features and advantages of the invention will becme apparent upon consideration of the following detailed description in conjunction with the drawing, in which.

Figure 1:
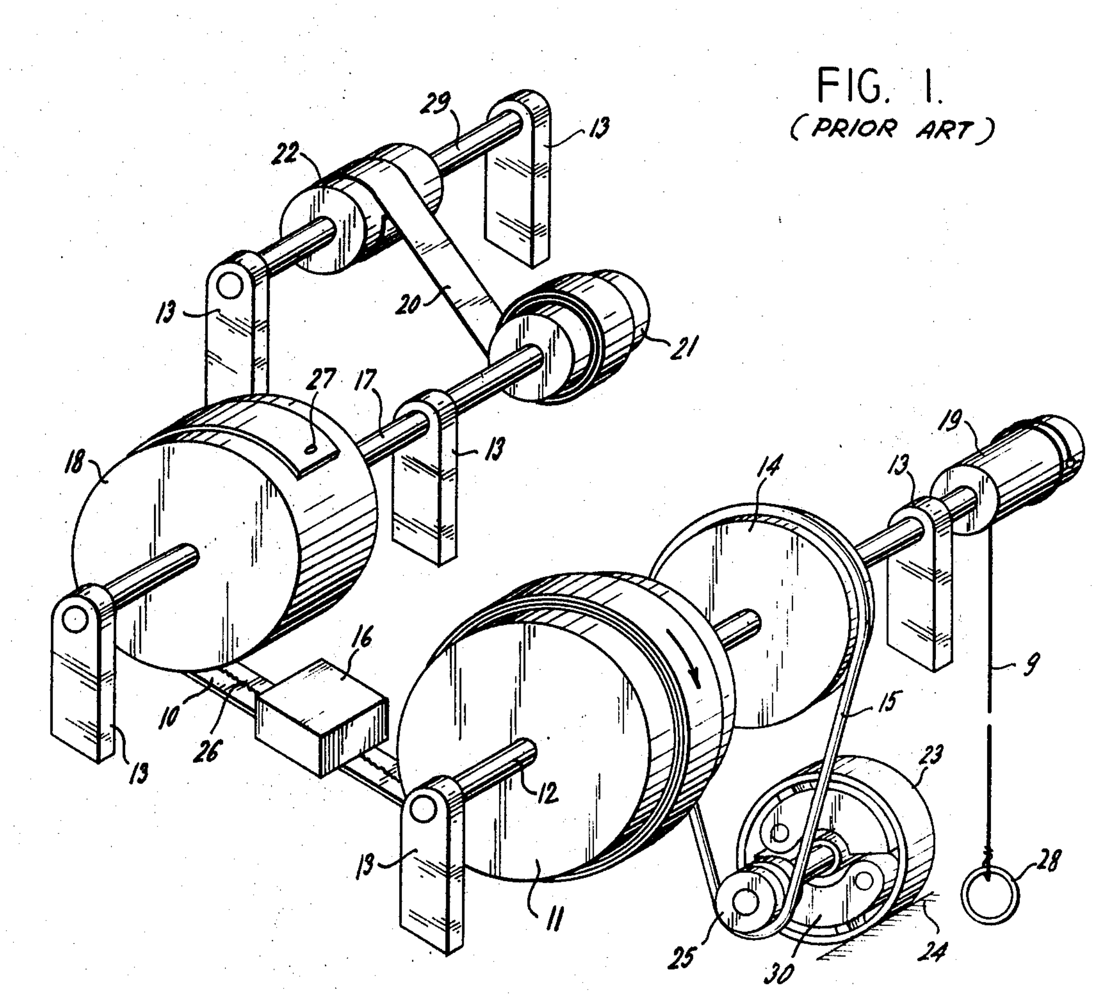
FIG. 1. (PRIOR ART)
FIG. 1 depicts in schematic form a prior art type miniature tape phonograph in which relatively large diameter take-up and supply drums and a large governor are required.

FIG. 1 depicts a prior art tape phonograph device. Since the construction of such devices are well known, the basic components thereof are shown only symbolically in the drawing. Groove 26 in tape 10 has recorded in it the message which is heard during each play. One end of the tape is secured to take-up drum 18 as shown at 27. The other end of the tape (not visible in the drawing) is secured to supply drum 11. In the rest condition, almost all of the tape is wound on drum 18. When the child desires to play the device ring 28 is pulled. Typically, the entire device is contained within a doll, with ring 28 being external to the doll body and string 9 extending through a hole in the body. When ring 28 and string 9 are pulled, drum 11 is turned in a direction opposite to that shown by the arrow in the drawing, and the tape is wound on this drum. Upon release of the string, shaft 17 turns to transfer the tape from drum 11 back to drum 18. As the tape passes playback unit 16, a stylus (not shown) picks up the message recorded in groove 26 to audibly reproduce it. At the end of the play, the tape remains on drum 18 until string 9 is once again pulled by the child.

Shaft 12 is mounted in posts 13 secured to frame 24. The shaft is freely rotatable in the posts, and has attached to it tape supply drum 11, pulley 14 and string drum 19. With the string fully wound on drum 19, it is apparent that the pulling of ring 28 causes the drum to rotate in the counter-clockwise direction. This in turn causes drum 11 to rotate in the direction opposite to that shown in the drawing by the arrow, and tape 10 to be unwound from drum 18 and wound up on drum 11.

Shaft 17 is also secured in two posts 13. Attached to the shaft are both tape take-up drum 18 and spring output drum 21. During the winding operation, as the tape is unwound from drum 18, shaft 17 turns in the counter-clockwise direction. Motor spring 20 is secured at one end to spring output drum 21 and is loosely coiled at the other end on spring storage durm 22. Drum 22 is secured to shaft 29 which is mounted in an additional two posts 13. The spring has a tendency to wind up on drum 22. As drum 21 is turned during the winding operation and the spring transferred, potential energy is stored in it.

Upon release of the string by the child, spring 20 transfers back to drum 22. In the process, drum 21, shaft 17 and drum 18 are turned in a clockwise direction. Tape 10 is transferred from drum 11 to drum 18 and the message recorded on it is played back. Drum 11 is rotated in the direction shown by the arrow, and shaft 12 and drum 19 turn with it. As drum 19 turns, the string is pulled into the doll and wound up on the drum.

To insure a relatively constant angular velocity of drum 11 during playback, governor 23 is provided. Belt 15 is wrapped around pulleys 14 and 15. Since pulley 14 is attached to shaft 12, the pulleys and belt turn during playback. (They also turn during wind-up, but the governor operation is not required at this time. For this reason the device may include a clutch mechanism as is known in the art.) As pulley 25 turns, conventional governor flyweights 30 rotate and develop a retarding force as the flyweights bear against case 23 which is secured to stationary member 24. The operation of such a governor mechanism is well known.

At the beginning of the play the effective diameter of take-up drum 18 is at its smallest value. The first layer of tape wrapped around the drum during the play of the unit is wrapped directly around the drum surface. As layer after layer of tape builds up on the drum, the effective diameter of the drum increases. Similarly, the effective diameter of supply drum 11 continuously decreases as the tape is unwrapped from it. These two effects tend to decrease the linear speed of the tape.

Assuming that spring 20 applies a constant torque to take-up drum 18, as the effective diameter to take-up drum 18 increases, the tape tension decreases, since the torque applied by the tape to the drum opposing the spring torque is a function of the product of the tape tension and the effective drum diameter. Thus, the tension in the tape leaving drum 18 decreases. At the same time that the tension is decreasing, so is the effective radius of drum 11. The decreasing tension and drum radius both cause a smaller torque to be applied to supply drum 11 with a resulting reduction in the angular velocity of the drum. As the angular velocity of the supply drum decreases, less and less tape is fed from the drum. This is not the major source of tape speed variation, however, because the governor tends to regulate the drum angular velocity.

The tape linear speed decreases primarily because as the supply drum diameter decreases, the length of tape comprising any one turn gets smaller and smaller, and even were the angular velocity of the supply drum to remain constant, less and less tape would be fed out as the play progresses.

Figure 2:
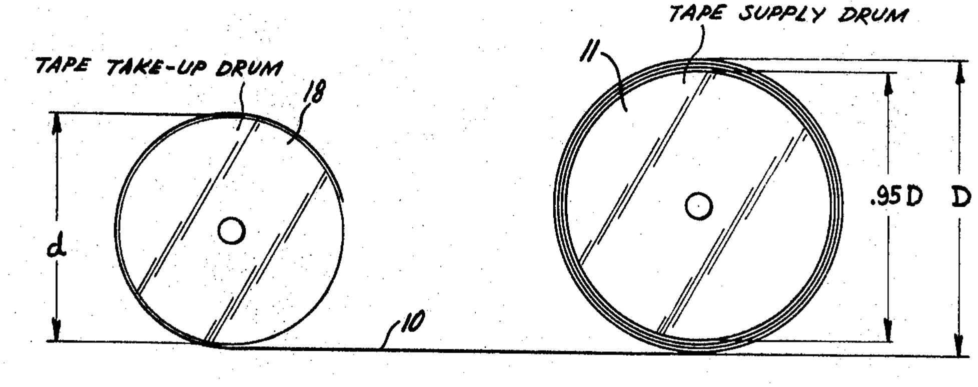
FIG. 2. (PRIOR ART)
FIG. 2 depicts the radial dimensions of the tape take-up and supply drums of FIG. 1.

The approach which is generally taken to minimize tape speed variations is to use large diameter tape take-up and supply drums, especially the latter. By using large diameter drums, the build-up effects may be made small. Referring to FIG. 2, which depicts an end view of drums 11 and 18, it is seen that with tape 10 fully wound on drum 11, the thickness of the tape layers is equal to .05 of the overall diameter at the beginning of the play. The effective diameter of the drum changes by approximately 5% during the course of the play. The effective diameter of drum 18, which is smaller than drum 11, increases during play more than 5%. The small build-up effects in a conventional design do not deleteriously affect the speed of the tape to the extent where changes in pitch would become intolerable. The disadvantages of the prior art audio device, however, are that the drums including the governor contribute substantially to the overall volume, and audio devices of miniature dimensions are not possible with the use of such drums. Also, relatively short messages are necessary or poor quality must be accepted.

Figure 3:
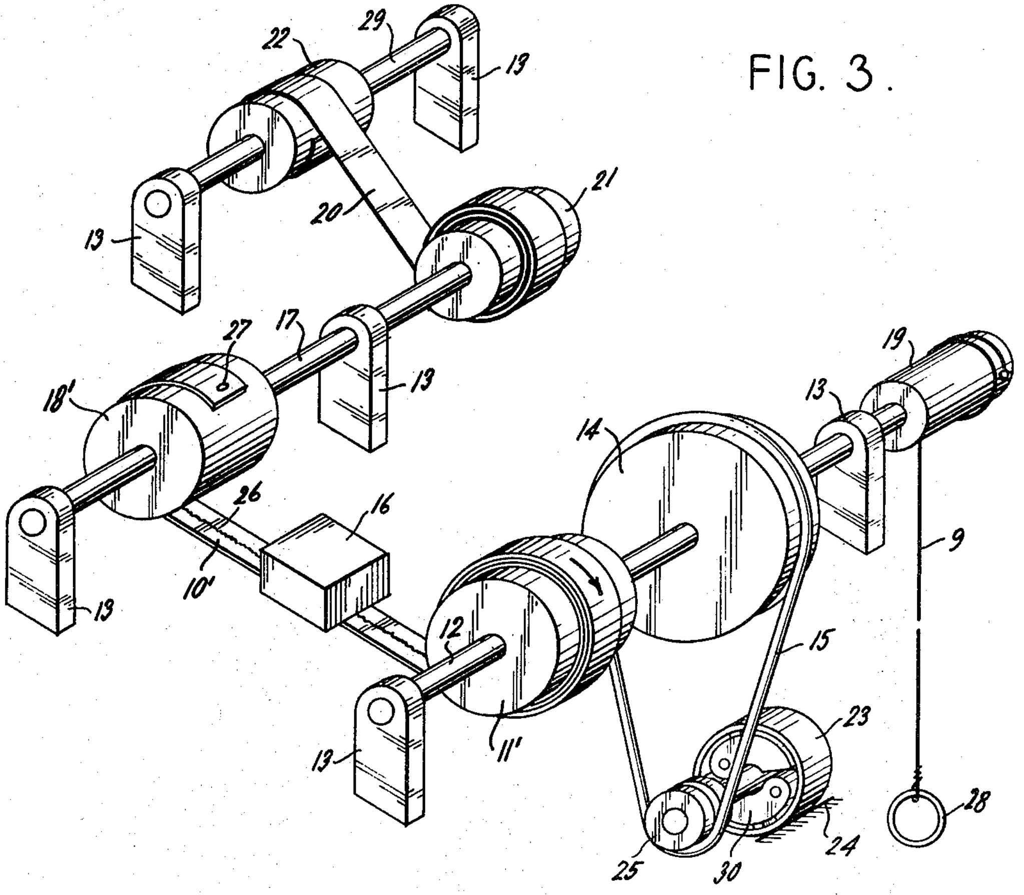
FIG. 3 depicts an illustrative embodiment of my invention.
Figure 4:
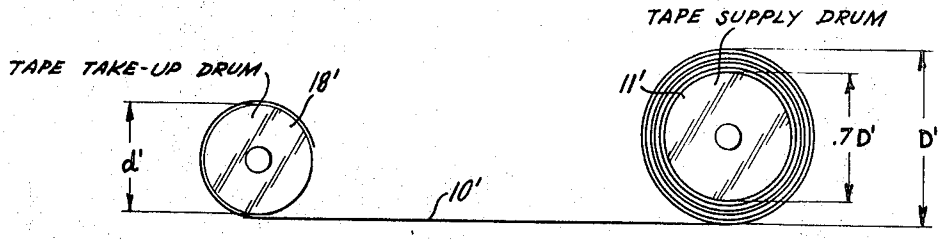
FIG. 4 depicts the dimensions of the tape take-up and supply drums of FIG. 3.
Figure 5:
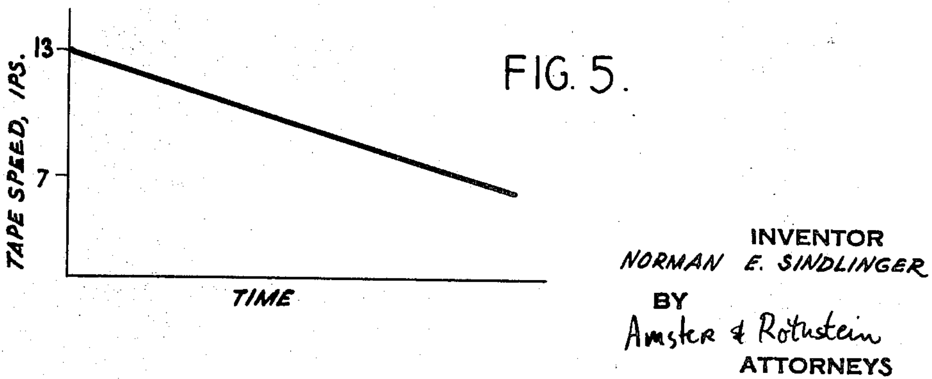
FIG. 5 is a speed versus time graph for the tape used in the embodiment of FIG. 3, including governor effects.

There are two main differences between the prior art mechanism of FIG. 1 and the illustrative embodiment of my invention shown in FIG. 3. First, the diameters of the tape take-up and supply drums 18' and 11' and the governor are considerably smaller. This, of course, permits a miniature construction. The second difference relates to the original magnetic tape or lacquer used to make tape 10'. With the use of small diameter drums, the tape build-up effects cause a speed reduction. The recording is such that for proper play it compensates for the tape speed as it goes slower and slower as the play progresses. The end view of the two drums of FIG. 3 is shown in FIG. 4. It will be observed that the thickness of the tape when it is fully wound on supply drum 11' is now 30% of the overall diameter of the fully wound drum. Neglecting governor effects, in the illustrative embodiment of the invention, the tape build-up effects cause a reduction in the speed of the tape of approximately 33⅓%. The total speed drop will include the governor speed change which ranges from a minimum of about 5% to a maximum of about 15%. The total speed reduction is essentially linear as shown in FIG. 5.

A mathematical analysis may be helpful in understanding the problem presented by tape build-up effects in the prior art, and their solution in the invention, not by eliminating them but rather by taking advantage of their presence. With a constant spring torque T (spring 20 in FIG. 3 is of this type, e.g., a Negator spring) applied to the take-up drum it can be shown that the angular velocity $\theta$ (in radians per second) of the tape supply drum can be expressed by the following equation: $T=k(d/D)\theta^2$, where $k$ is a constant, $d$ is the diameter of the tape take-up drum, and D is the diameter of the tape supply drum. The tape speed, at any instant, is equal to the product of the diameter of the supply drum (that is, the effective diameter including the tape layers) and half the angular velocity $\theta$ of the drum. Expressing the angular velocity in terms of the torque, the tape speed S, as a function of the two drum diameters, is:

$$S=(D/2)(TD/kd)^{1/2}=\tfrac{1}{2}(T/k)^{1/2}(D)^{3/2}/(d)^{1/2}$$

It is thus seen that the tape speed varies in accordance with the $3/2$ power of the supply drum diameter and the $1/2$ power of the take-up drum diameter. It should be noted that the supply drum diameter D decreases during playback thus contributing to a decrease in the tape speed. The take-up drum diameter $d$ increases as the play progresses, but because the factor $(d)^{1/2}$ is in the denominator of the expression, the increase in $d$ also tends to decrease the tape speed.

With large drum diameters, the values of D and $d$ do not change to too great an extent during the course of the play because the thickness of the tape on a fully wound drum is only a small percentage of the diameter of the unwound drum. In prior art designs, the drum diameters have been made large for this reason and/or the tape or message length has been limited.

Reference should be made at this point to another prior art technique for limiting variations in the tape speed. It is possible to include in the governor a pre-loading spring which has the effect of preventing effective governor action until the governor attains a predetermined speed. Once the operating speed is achieved, the basic torque equation expressed above for the unloaded governor takes the following form: $T=k(d/D)(\theta-K)^2$, where the additional quantity K arises from the nature of the governor pre-loading. The tape speed is still the product of the supply drum diameter and half the angular velocity of the supply drum, which can be expressed in terms of the torque as follows:

$$S=[D/2][(TD/kd)^{1/2}+K]$$

If the quantity K is large compared to the quantity $(TD/kd)^{1/2}$, the speed equation becomes $S=KD/2$. In such a case, the speed of the tape varies in accordance with the 3/2 power of the supply drum diameter. Moreover, the tape speed is relatively independent of the take-up drum diameter. Pre-loading of the governor can thus in itself prevent substantial changes in the tape speed. If the governor size is also kept small for miniature design purposes it is necessary to increase its angular velocity in order to effectively pre-load the governor. As a practical matter the governor effectiveness is proportional to the cube of its speed and only directly proportional to size factors. With a small supply drum diameter the average governor angular velocity is such that even for a miniature governor, speed changes due to torque changes will be less than 5%. Thus, most of the total speed change will be directly proportional to supply drum build-up changes and for the same total allowable speed change, message length and average linear tape speed, smaller drums may be used than for the simple unloaded large governor.

In accordance with the principles of my invention, it is not necessary to use large diameter drums or a large governor to achieve constant speed during the play. Instead, small diameter drums and a small governor are used and the tape recording is adjusted accordingly.

Added advantages of the device of FIG. 3 are that the message length, average speed and tape thickness may be increased. Even with small drums, large tape layer thicknesses are possible within a total speed change of 45% or more. Although not shown in the illustrative embodiment of the invention the stylus may be placed adjacent drum 18' to track the outer layer on the drum because with a thicker tape there are no echos read from lower layers.

Figure 6:
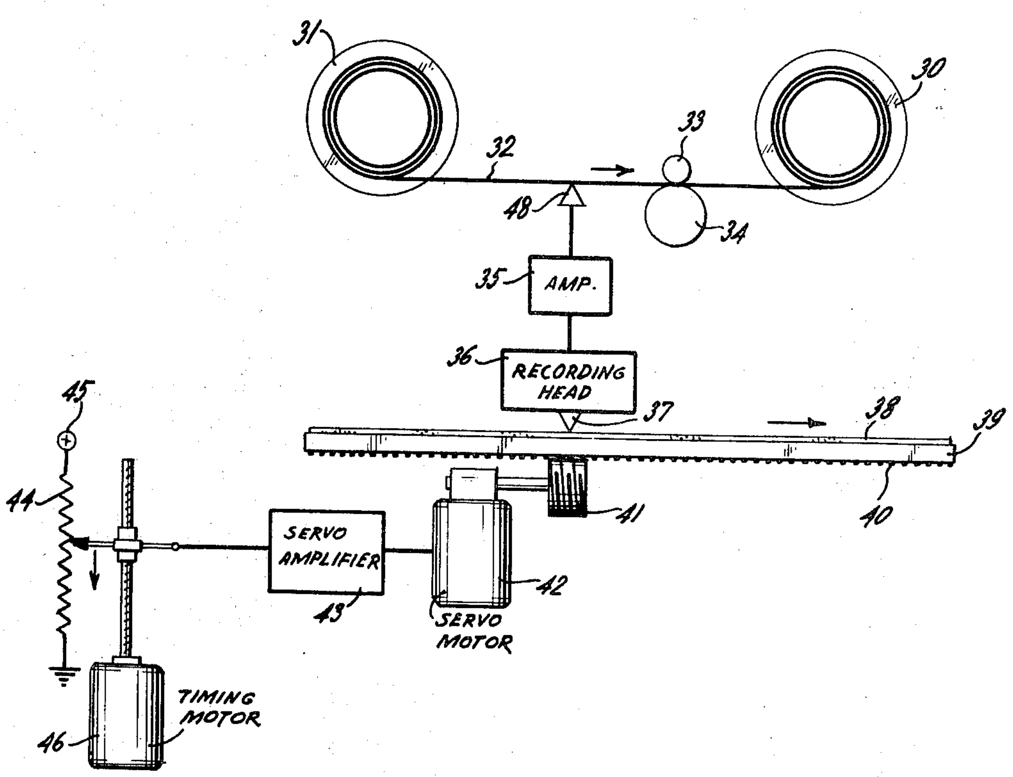
FIG. 6 depicts one illustrative mechanism for constructing a stamper for manufacturing tapes for use in miniature tape phonographs in accordance with the invention.
Figure 7:
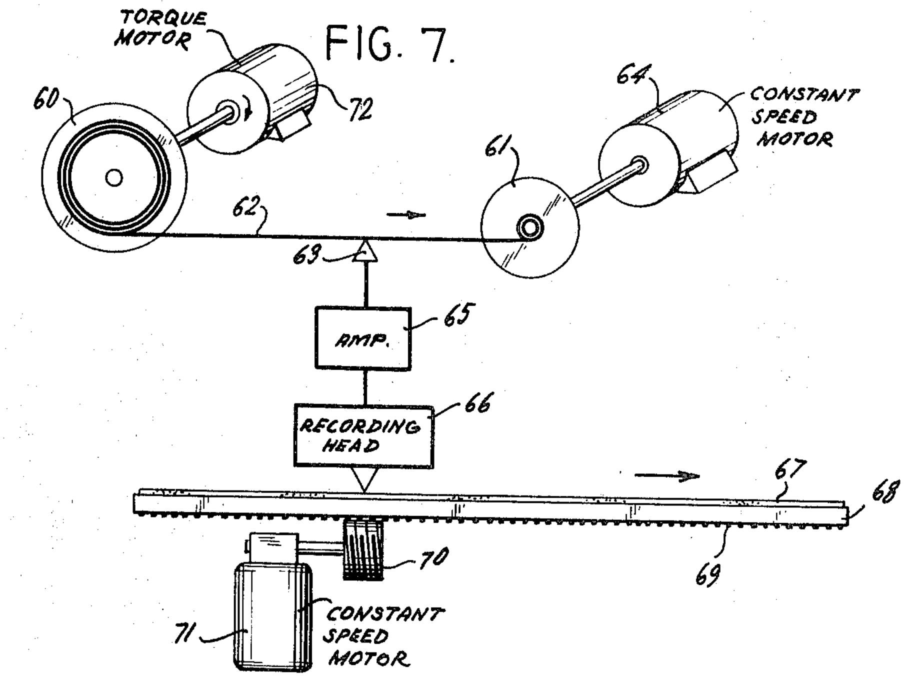
FIG. 7 depicts another illustrative mechanism for constructing such a stamper.

My invention requires, of course, the use of a tape which requires a progressively decreasing speed for proper play. It is as though the recording were made on the tape as the tape slowed down during the recording process. Obviously, the phonograph tapes are not produced individually in a mass production set-up. Instead, a metal stamper may be made from which the phonograph tapes are embossed. FIGS. 6 and 7 show two alternative arrangements for making stampers suitable for embossing phonograph tapes for use in the audio device of FIG. 3. In both cases, a stamper is made which is capable of embossing phonograph tapes on which the effective recording is made with a progressively decreasing tape speed.

As in conventional practice, the message is first recorded on magnetic tape. The tape is then edited, including all necessary and desired equalization, volume compression, reverberation, etc. The message on the magnetic tape is then cut on a lacquer-coated aluminum base as is standard practice. The lacquer is then electroplated to provide a stamper with which sound track phonograph tapes may be mechanically reproduced. FIG. 6 shows one system for transferring the message on the edited magnetic tape to the lacquer.

Magnetic tape 32 is wound between reels 30 and 31. The tape passes through capstan drive 33 and idler 34. The capstan rotates at a constant speed and consequently the magnetic tape moves at a constant speed past tape head 48.

The signal picked up by tape head 48 is amplified by amplifier 35 and extended to recording head 36. The recording head drives cutting stylus 37 in accordance with the original message signal. Thus far, the system components are conventional.

Lacquer-coated aluminum base 38 is held on table 39, to the underside of which there is attached rack 40. The rack, table and aluminum base are moved in the direction shown by worm gear 41, controlled by servo motor 42. Servo motor 42 is powered by servo amplifier 43, the input signal to which is a DC potential from potentiometer 44. The potential is continuously variable. Potentiometer 44 is connected between ground and source 45. The servo amplifier input is coupled to the potentiometer tap which is continuously moved by timing motor 46. The arrangement is such that the input to the amplifier decreases linearly. This in turn results in a decreasing speed of table 39. Consequently, the recording is made in a medium whose speed progressively decreases. Since the initial recording is eventually made in all of the sound track phonograph tapes, it is as though each tape were progressively slowed down during the recording of a message on it.

In the alternative system of FIG. 7, table 68 moves at a constant speed. Lacquer-coated aluminum base 67 is placed on top of the table, and rack 69 is attached to the underside of the table. Worm gear 70 drives the rack, the gear being controlled by constant speed motor 71. Consequently, the recording is made on a medium which moves at a constant speed. Edited magnetic tape 62, however, does not move at a constant speed.

The tape is transferred from reel 60 to reel 61, tape head 63 detecting the signal and passing it on through amplifier 65 to recording head 66. The diameter of reel 61 is relatively small. The reel is turned at a constant speed by motor 64. Consequently, as layers of tape build up on reel 61, the speed of the tape moving past tape head 63 increases. The pitch of the signal detected by tape head 63 progressively increases. It is as though a person making a recording spoke faster and faster as the recording progressed. The tape made by the stamper exhibits the same characteristic. To achieve a proper reproduction of the message, the tape speed must progressively decrease to counteract the progressively increasing recording speed. Torque motor 72 serves to maintain proper back tension on the tape.

Although the invention has been described with reference to a particular embodiment it is to be understood that this embodiment is merely illustraative of the application of the principles of the invention. For example, in a device having a multiple message tape on which a number of parallel tracks are provided in conjunction with a message selection mechanism, all of the messages would be recorded with an effective decreasing tape speed. Thus, numerous modifications may be made in the illustrative embodiment of the invention and other arrangements may be devised without departing from the spirit and scope of the invention.

What is claimed is:

1. A miniature phonograph tape audio device comprising a tape take-up drum, a tape supply drum, a message phonograph tape attached at opposite ends thereof to said take-up and supply drums, sound-reproducing means adjacent said tape for reproducing signals recorded on said tape as said tape is transferred from said supply drum to said take-up drum, means for transferring said tape from said take-up drum to said supply drum, substantially constant torque means for subsequently controlling the transfer of said tape from said supply drum to said take-up drum, and governor means for regulating the angular velocity of said supply drum while said tape is being transferred from said supply drum to said take-up drum, said take-up and supply drums having diameters small enough to cause substantial tape build-up effects during the transfer of said tape from said supply drum to said take-up drum and a reduction of at least one-third in the linear speed of said tape from the beginning of said transfer until the end of said transfer, said tape having a message signal recorded thereon such that for proper reproduction of said message by said sound-reproducing means the linear speed of said tape must be reduced by said at least one-third as said tape moves past said sound-reproducing means.

2. A miniature phonograph tape audio device in accordance with claim 1 wherein the signal recorded on said tape is the type of signal which would be recorded were the tape to be slowed down by at least one-third during the progress of the recording.

3. A miniature phonograph tape audio device in accordance with claim 1 wherein said transferring means includes a string operatively connected to said supply drum and said substantially constant torque means includes a spring motor operatively connected to said take-up drum.

4. A miniature phonograph tape audio device in accordance with claim 1 wherein the thickness of the tape layers along a diameter of said supply drum when said tape is fully wound on said supply drum is greater than 3/7 of the diameter of said supply drum.

5. A miniature phonograph tape audio device in accordance with claim 1 wherein said transferring means includes a string operatively connected to said supply drum, and said substantially constant torque means includes a spring motor operatively connected to said take-up drum, and said spring motor applies a substantially constant torque to said take-up drum during the transfer of said tape from said supply drum to said take-up drum.

References Cited

UNITED STATES PATENTS

| | | | |
|---|---|---|---|
| 3,285,613 | 11/1966 | Hallamore. | |
| 3,389,915 | 6/1968 | Owen et al. | 274—11 |

GEORGE F. MAUTZ, Primary Examiner

U.S. Cl. X.R.

46—117; 179—100.2; 274—11